(12) United States Patent
Shimoyama et al.

(10) Patent No.: US 9,310,265 B2
(45) Date of Patent: Apr. 12, 2016

(54) TACTILE SENSOR AND MULTI-AXIAL TACTILE SENSOR

(71) Applicant: The University of Tokyo, Toyko (JP)

(72) Inventors: Isao Shimoyama, Tokyo (JP); Kiyoshi Matsumoto, Tokyo (JP); Akihito Nakai, Tokyo (JP); Hidetoshi Takahashi, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 110 days.

(21) Appl. No.: 14/345,799

(22) PCT Filed: Sep. 19, 2012

(86) PCT No.: PCT/JP2012/073901
§ 371 (c)(1),
(2) Date: Mar. 19, 2014

(87) PCT Pub. No.: WO2013/042680
PCT Pub. Date: Mar. 28, 2013

(65) Prior Publication Data
US 2014/0224037 A1    Aug. 14, 2014

(30) Foreign Application Priority Data

Sep. 22, 2011 (JP) ................................. 2011-206966

(51) Int. Cl.
*G01L 1/22* (2006.01)
*G01L 1/04* (2006.01)
(Continued)

(52) U.S. Cl.
CPC ................. *G01L 1/2206* (2013.01); *G01L 1/04* (2013.01); *G01L 5/166* (2013.01); *G01L 5/228* (2013.01)

(58) Field of Classification Search
CPC ........... G01L 1/04; G01L 5/228; G01L 5/226; G01L 5/22; G01L 5/166; G01L 1/2206
USPC ....................... 73/862.045, 862.632, 862.633, 73/862.634, 862.637, 862.638, 862.639
See application file for complete search history.

(56) References Cited

U.S. PATENT DOCUMENTS

| 4,478,089 A * | 10/1984 | Aviles ..................... B25J 13/082 73/862.044 |
| 5,230,252 A * | 7/1993 | O'Brien ................... G01B 7/18 73/862.637 |
| 5,336,854 A * | 8/1994 | Johnson ............... G01G 3/1412 73/862.627 |

(Continued)

FOREIGN PATENT DOCUMENTS

JP    S61224465 A    10/1986
JP    H08184462 A    7/1996
(Continued)

*Primary Examiner* — Lisa Caputo
*Assistant Examiner* — Philip Cotey
(74) *Attorney, Agent, or Firm* — Pearne & Gordon LLP

(57) ABSTRACT

A tactile sensor and a multi-axial tactile sensor are provided, each of which is thin and can measure shearing force. A multi-axial tactile sensor 1 includes a sensor element 2 provided in a plane substantially at the same level as the surface of a substrate 6, and an outer package member 42 covering around the sensor element 2 and transmitting external force to the sensor element 2. The sensor element 2 includes a flexible beam 7 (8) having at least one end supported by the substrate 6. The sensor element 2 detects deformation of the beam 7 (8), the deformation being caused in the direction in parallel with the surface of the substrate 6.

13 Claims, 15 Drawing Sheets

(51) Int. Cl.
*G01L 5/16* (2006.01)
*G01L 5/22* (2006.01)

(56) References Cited

U.S. PATENT DOCUMENTS

| | | | | |
|---|---|---|---|---|
| 5,510,581 | A | * | 4/1996 | Angel .................... G01G 3/141 177/211 |
| 5,684,428 | A | | 11/1997 | Nomura et al. |
| 8,359,931 | B2 | | 1/2013 | Nishiwaki |
| 2003/0097887 | A1 | * | 5/2003 | LaVar .................. G01G 23/005 73/862.639 |
| 2004/0093954 | A1 | * | 5/2004 | Gottlieb ................ G01L 19/147 73/754 |
| 2005/0034543 | A1 | * | 2/2005 | Xi ......................... B82Y 35/00 73/862.634 |
| 2006/0016268 | A1 | | 1/2006 | Nagasaka et al. |
| 2006/0037409 | A1 | * | 2/2006 | Ichige .................... G01L 5/161 73/862 |
| 2008/0083289 | A1 | * | 4/2008 | Kumar ..................... G01L 1/24 73/862.624 |
| 2011/0121591 | A1 | * | 5/2011 | Nishiwaki ............... B66C 1/445 901/46 |
| 2011/0193363 | A1 | * | 8/2011 | Nishiwaki .............. B25J 13/083 73/775 |
| 2012/0304778 | A1 | * | 12/2012 | Nakamura ............. G01L 5/228 73/778 |

FOREIGN PATENT DOCUMENTS

| | | |
|---|---|---|
| JP | 2006038540 A | 2/2006 |
| JP | 2006208248 A | 8/2006 |
| JP | 2008281403 A | 11/2008 |
| JP | 2010169597 A | 8/2010 |
| JP | 2011112459 A | 6/2011 |
| JP | 2011169749 A | 9/2011 |

* cited by examiner

TACTILE SENSOR AND MULTI-AXIAL TACTILE SENSOR

TECHNICAL FIELD

The present invention relates to a tactile sensor and a multi-axial tactile sensor, which are suitable, for example, in the case where grasping force, frictional force, and the like are measured.

BACKGROUND ART

In order to perform an operation, such as an operation of grasping and lifting an object, by using a robot hand, it is necessary to measure not only the grasping force but also the state of frictional force and the like generated on the contact surface between the surface of the robot hand and the surface of the object. Preferably, the state of such contact surface is directly measured by means of a contact sensor.

As a contact sensor, a tactile sensor 100 as shown in FIG. 16 is disclosed that includes a structure body 103 having a sensitive section 102 supported by a hinge section 101, a detection section for detecting the attitude of the sensitive section 102, and an elastic body 104 covering at least the sensitive section 102 of the structure body 103 (for example, Patent Literatures 1 to 3).

In Patent Literatures 1 to 3 described above, when shearing force is applied to the elastic body 104, for example, in the x-direction in FIG. 16, the sensitive section 102 is deformed together with the elastic body 104, and hence the shearing force can be measured by detecting the deformation of the sensitive section 102 by using a piezo-electric element serving as the detection section.

CITATION LIST

Patent Literature

Patent Literature 1: Japanese Patent Laid-Open No. 2006-208248
Patent Literature 2: Japanese Patent Laid-Open No. 2008-281403
Patent Literature 3: Japanese Patent Laid-Open No. 2010-169597

SUMMARY OF INVENTION

Technical Problem

However, in Patent Literatures 1 to 3 described above, the structure having a cantilever erected from a substrate is used in order to detect shearing force, and hence it is difficult to reduce the thickness of the structure to less than the height of the cantilever.

In view of the above-described problem, an object of the present invention is to provide a tactile sensor and a multi-axial tactile sensor which have a thinner structure and which are capable of detecting shearing force.

Solution to Problem

A tactile sensor according to the present invention includes a sensor element provided in a plane substantially at the same level as a surface of a substrate, and an outer package member covering around the sensor element and transmitting external force to the sensor element, wherein the sensor element includes a flexible beam having at least one end supported by the substrate, and the sensor element detects deformation of the beam, the deformation being caused in the direction in parallel with the surface of the substrate.

In the tactile sensor according to another aspect of the present invention, the beam includes a deformation section with a resistive layer formed on the surface thereof, the surface being extended or compressed to be deformed by the external force.

In the tactile sensor according to another aspect of the present invention, the deformation section includes a first deformation section having a first resistive layer formed on a surface thereof, the surface being extended or compressed to be deformed by the external force, and a second deformation section having a second resistive layer formed on a surface thereof, the surface being compressed or extended to be deformed by the external force in the direction opposite to extension or compression of the first deformation section, and a voltage corresponding to the ratio between a resistance value of the first resistive layer and a resistance value of the second resistive layer is measured.

In the tactile sensor according to another aspect of the present invention, the beam includes a conductive layer formed except the first and second deformation sections so as to be conductive to the first and second resistive layers.

In the tactile sensor according to another aspect of the present invention, the first and second deformation sections of the beam are formed to be thinner than the other portions of the beam.

In the tactile sensor according to another aspect of the present invention, one of the first and second resistive layers is configured by a layer having a fixed resistance value.

In the tactile sensor according to another aspect of the present invention, a surface of the outer package member facing the surface of the substrate is formed substantially in parallel with the surface of the substrate.

In the tactile sensor according to another aspect of the present invention, the outer package member includes a filling section covering around the sensor element, and a surface section covering the surface of the filling section and made of a material having an elastic modulus different from the elastic modulus of the filling section.

In the tactile sensor according to another aspect of the present invention, the outer package member includes a first filling section covering around the sensor element, and a second filling section made of a material having a bulk modulus different from the bulk modulus of the first filling section.

In the tactile sensor according to another aspect of the present invention, the beam of the sensor element is deformed by shearing force applied to the surface of the outer package member.

In the tactile sensor according to another aspect of the present invention, the sensor element includes two beams arranged in parallel with each other and horizontally with respect to the substrate, both ends of each of the beams being supported by the substrate, one of the beams is provided with the first deformation section, and the other of the beams is provided with the second deformation section, and the first and second deformation sections are extended or compressed to be deformed by shearing force applied to the surface of the outer package member.

In the tactile sensor according to another aspect of the present invention, the sensor element includes three beams arranged in parallel with each other and horizontally with respect to the substrate, one end of each of the beams being supported by the substrate, and the sensor element includes a connection section connecting the other ends of the beams to each other, one of the two beams of the three beams arranged on outer sides is provided with the first deformation section, and the other the two beams of the three beams arranged on the outer sides is provided with the second deformation section, and the first and second deformation sections are extended or compressed to be deformed by shearing force applied to the surface of the outer package member.

A multi-axial tactile sensor according to the present invention includes a plurality of sensor elements provided in a plane substantially at the same level as the surface of a substrate, and an outer package member covering around the sensor elements and transmitting external force to the sensor element, wherein the sensor elements each include a flexible beam having at least one end supported by the substrate and the sensor elements detect deformation of the beam, the deformation being caused in the direction in parallel with the surface of the substrate.

Advantageous Effects of Invention

With the present invention, it is possible to provide a tactile sensor and a multi-axial tactile sensor, which include a sensor element provided in a plane substantially at the same level as the surface of the substrate, so as to detect deformation of the beam caused in the direction in parallel with the surface of the substrate, and which can thereby detect external force with a structure thinner than a conventional sensor using an erected cantilever.

REFERENCE SIGNS LIST

Figure 1:
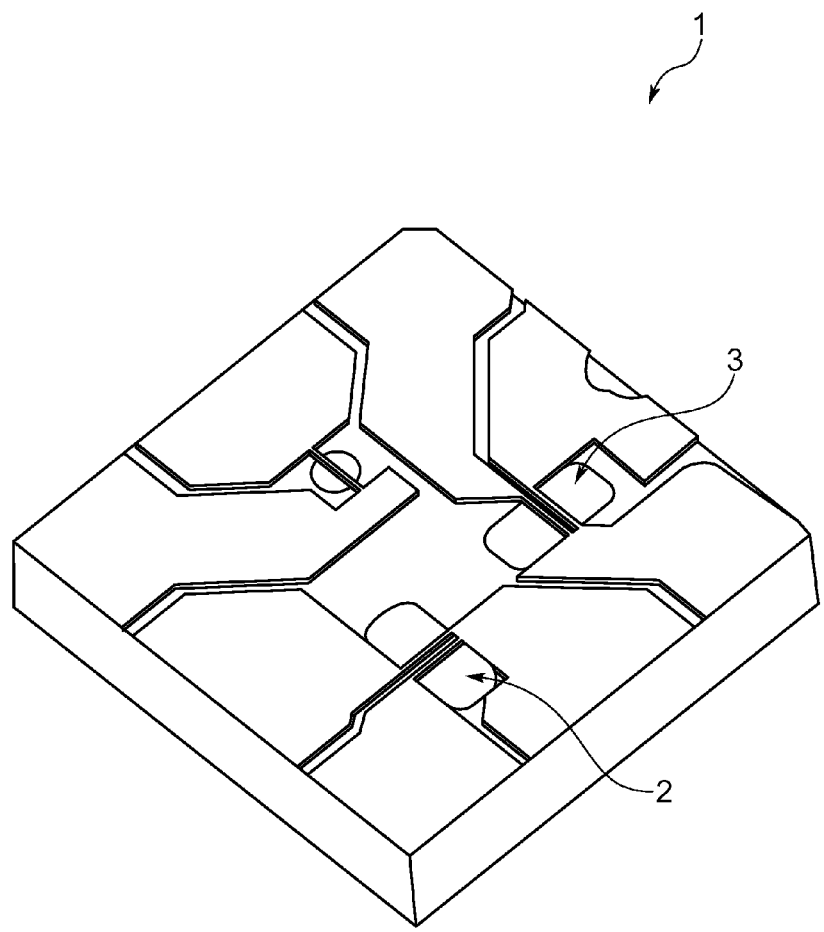
FIG. 1 is a perspective view showing an entire configuration of a multi-axial tactile sensor according to a first embodiment.

1 Multi-axial tactile sensor
2 First sensor element (sensor element)
2A Tactile sensor
3 Second sensor element (sensor element)
6 Substrate
7 First beam (beam)
8 Second beam (beam)
9 First resistive layer
10 Second resistive layer
12 First conductive layer (conductive layer)
13 Second conductive layer (conductive layer)
36 First detecting section (first deformation section)
37 Second detecting section (first deformation section)
38 Third detecting section (second deformation section)
39 Fourth detecting section (second deformation section)
42 Outer package member
43 Filling section

DESCRIPTION OF EMBODIMENTS

In the following, embodiments according to the present invention will be described in detail with reference to the drawings.

(1) First embodiment (with two doubly-supported beams)
(Entire Configuration)

As shown in FIG. 1, a multi-axial tactile sensor 1 according to a present embodiment includes a plurality of sensor elements arranged in different directions. In the case of FIG. 1, in the multi-axial tactile sensor 1, a first sensor element 2 and a second sensor element 3 are provided, as sensor elements, in a plane substantially at the same level as the surface of a substrate and are entirely covered with an outer package member (not shown in FIG. 1). The multi-axial tactile sensor 1 is configured such that x-direction force and y-direction force, which are applied to the outer package member, can be measured by the sensor elements 2 and 3, respectively. It should be noted that, in this specification, "x", "y" and "z" in each of figures are referred to as the x-direction, the y-direction, and the z-direction, respectively.

In the case of the present embodiment, the beam of each of the sensor elements 2 and 3 is formed to be able to be elastically deformed together with the outer package member by external force, for example, shearing force, applied to the outer package member. Here, the shearing force means a force directed in the horizontal direction (in the x-direction or the y-direction in FIG. 1) with respect to the surface of the substrate.

(First and Second Sensor Elements)

Next, the configuration of the first and second sensor elements 2 and 3 will be described. The first and second sensor elements 2 and 3 have the same configuration and are different from each other only in their arrangement directions, and hence only the configuration of the first sensor element 2 is described.

Figure 2:
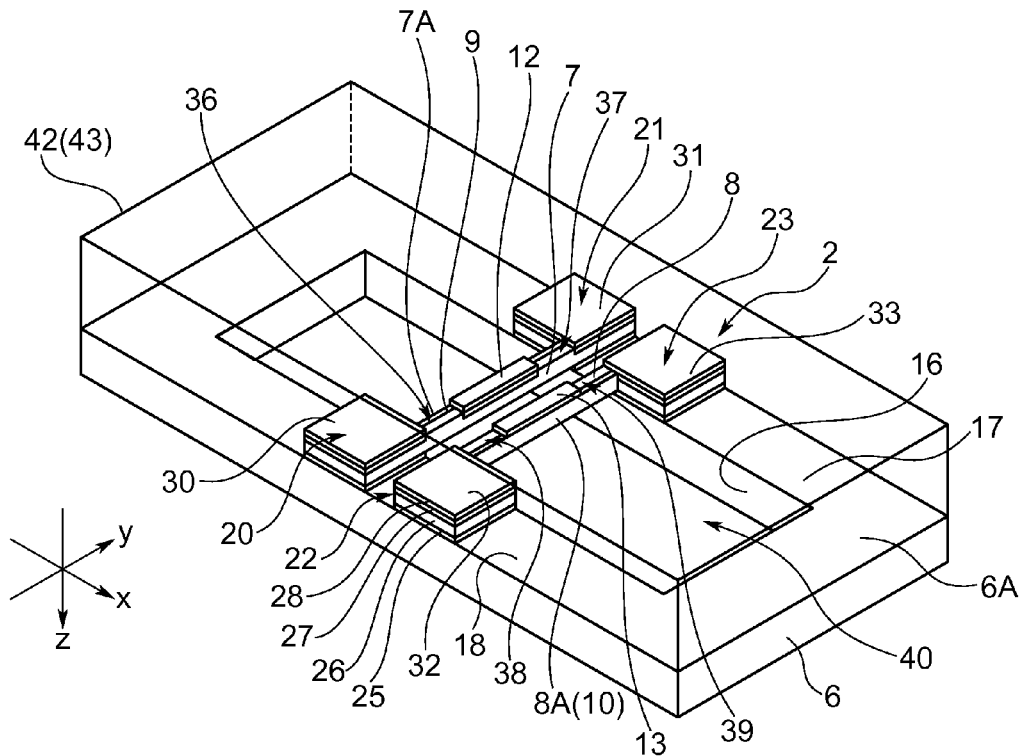
FIG. 2 is a perspective view showing a configuration of a first sensor element according to the first embodiment.

As shown in FIG. 2, the first sensor element 2 includes two beams, that is, a first beam 7 and a second beam 8, both ends of each of which are supported on a substrate 6. Each of the first and second beams 7 and 8 is formed of silicon so as to have substantially the same mechanical properties and has substantially the same length. The first and second beams 7 and 8 are arranged substantially in parallel with each other and substantially horizontally with respect to the surface of the substrate 6. The first and second beams 7 and 8 are formed very close to each other at an interval of, for example, about 10 μm.

In the first beam 7, a first resistive layer 9 is formed on one surface (hereinafter also referred to as "outer side surface") 7A opposite to the surface facing the second beam 8. Similarly, in the second beam 8, a second resistive layer 10 is formed on the other surface (hereinafter also referred to as "outer side surface") 8A opposite to the surface facing the first beam 7. The first and second resistive layers 9 and 10 are formed so that the surface of each of the first and second resistive layers 9 and 10 is substantially perpendicular to a substrate surface 6A.

Further, a first conductive layer 12, as a conductive layer, is formed at a central portion on the upper surface of the first beam 7, and a second conductive layer 13, as a conductive layer, is formed at a central portion on the upper surface of the second beam 8. The first conductive layer 12 is electrically conductive to the first resistive layer 9, and the second conductive layer 13 is electrically conductive to the second resistive layer 10.

In the case of the present embodiment, a rectangular square hole 16 is formed in the substrate 6. Each of the first and second beams 7 and 8 is stretched between the short sides of the square hole 16. The first and second beams 7 and 8 are supported on the substrate 6 by first to fourth support sections 20 to 23 provided on the sides 17 and 18 facing each other via the square hole 16. Both ends of the first beam 7 are respectively supported on the substrate 6 by the first and second support sections 20 and 21, and both ends of the second beam 8 are respectively supported on the substrate 6 by the third and fourth support sections 22 and 23. Each of the first to fourth support sections 20 to 23 is formed by laminating, in order, an insulating layer 25, a beam forming layer 26, a resistive layer 27, and a conductive layer 28. The beam forming layer 26 is made of silicon and forms each of the first and second beams 7 and 8. The conductive layer 28 formed in the first support section 20 constitutes a power supply electrode 30, and the conductive layer 28 formed in the second support section 21 constitutes a first output electrode 31. Further, the conductive layer 28 formed in the third support section 22 constitutes a grounding electrode 32, and the conductive layer 28 formed in the fourth support section 23 constitutes a second output electrode 33. The first output electrode 31 and the second output electrode 33 are electrically connected to each other by a circuit not shown. Further, the first resistive layer 9 is formed integrally with the resistive layer 27 formed in each of the first and second support sections 20 and 21, and the second resistive layer 10 is formed integrally with the resistive layer 27 formed in each of the third and fourth support sections 22 and 23. Each of the first and second resistive layers 9 and 10 is configured by a piezoresistive layer.

A first detecting section 36 and a second detecting section 37, which serve as a first deformation section, are formed in the first beam 7. That is, the first detecting section 36 having no conductive layer is formed between the power supply electrode 30 and the first conductive layer 12, and the second detecting section 37 having no conductive layer is formed between the first output electrode 31 and the first conductive layer 12. Similarly, a third detecting section 38 and a fourth detecting section 39, which serve as a second deformation section, are formed in the second beam. That is, the third detecting section 38 having no conductive layer is formed between the grounding electrode 32 and the second conductive layer 13, and the fourth detecting section 39 having no conductive layer is formed between the second output electrode 33 and the second conductive layer 13.

A space 40 is formed around the first and second beams 7 and 8, which allows the first and second beams 7 and 8 to be flexible. The periphery of the first and second beams 7 and 8 including the space 40 is covered with an outer package member 42. The outer package member 42 includes a filling section 43 for filling the space 40 and the periphery of the first and second beams 7 and 8. The filling section 43 can be formed, for example, of silicone resin. As the silicone resin, for example, PDMS (polydimethylsiloxane) can be used. Further, the outer package member 42 may also include a surface section (not shown) covering the surface of the filling section 43. In this case, the surface section may be formed of a material having an elastic modulus different from the elastic modulus of the filling section 43. When the surface section is formed of a material, for example, photo-curing resin, harder than the material of the filling section 43, the shearing force can be transmitted more uniformly to the first sensor element 2. Further, as the outer package member, for example, a metal (aluminum), and the like, can be used other than the silicone resin described above.

Figure 3:
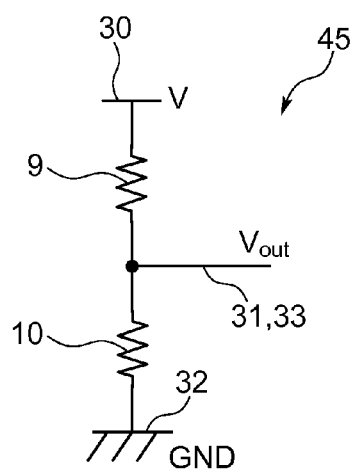
FIG. 3 is a circuit diagram showing a configuration of a resistance ratio output circuit according to the first embodiment.

The first sensor element 2 configured in this way is connected to a circuit so that a voltage corresponding to the ratio of resistance values of the first resistive layer 9 and the second resistive layer 10 can be measured. In the case of the present embodiment, as shown in FIG. 3, the first resistive layer 9 and the second resistive layer 10 are connected to each other in series to form a resistance ratio output circuit 45 as a whole. That is, in the resistance ratio output circuit 45, the power supply electrode 30, the first resistive layer 9, the first output electrode 31, the second output electrode 33, the second resistive layer 10, and the grounding electrode 32 are connected together in series in this order.

(Manufacturing Method)

Figure 4A:
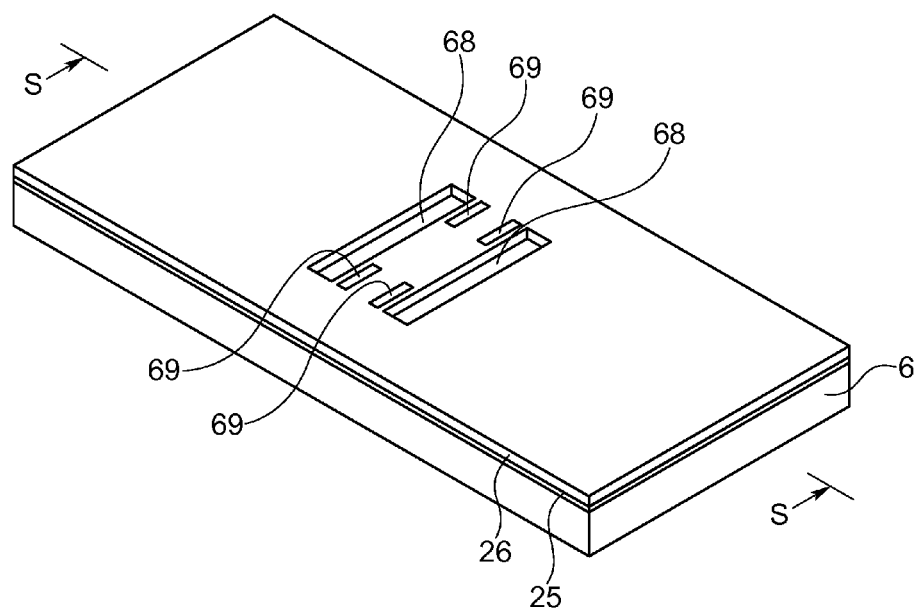
FIG. 4A is a perspective view showing a step of a manufacturing method of the first sensor element according to the first embodiment.
Figure 4B:
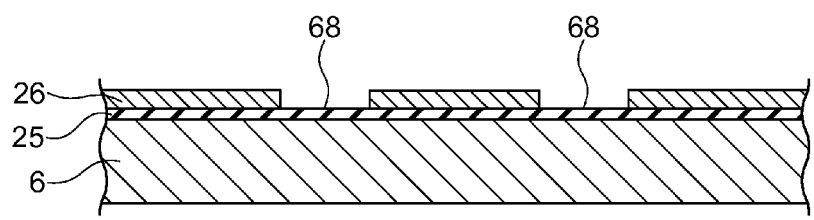
FIG. 4B is an end elevational view along the line S-S in FIG. 4A.

Next, a manufacturing method of the first sensor element 2 will be described. First, the insulating layer 25 made of $SiO_2$ is formed on the substrate 6, and further the beam forming layer 26 made of Si is formed on the insulating layer 25, so that an SOI structure of the substrate 6, the insulating layer 25, and the beam forming layer 26 is formed. Then, as shown in FIG. 4, a pair of rectangular-shaped holes 68 are formed in the beam forming layer 26. The adjacent inner surfaces of the rectangular-shaped holes 68 serve as the surfaces on which the first and second resistive layers 9 and 10 of the first and second beams 7 and 8 are formed, respectively. Further, a protective film (not shown) made of $SiO_2$, and the like, is formed on portions 69 corresponding to the upper surfaces of the first to fourth detecting sections 36 to 39.

Figure 5A:
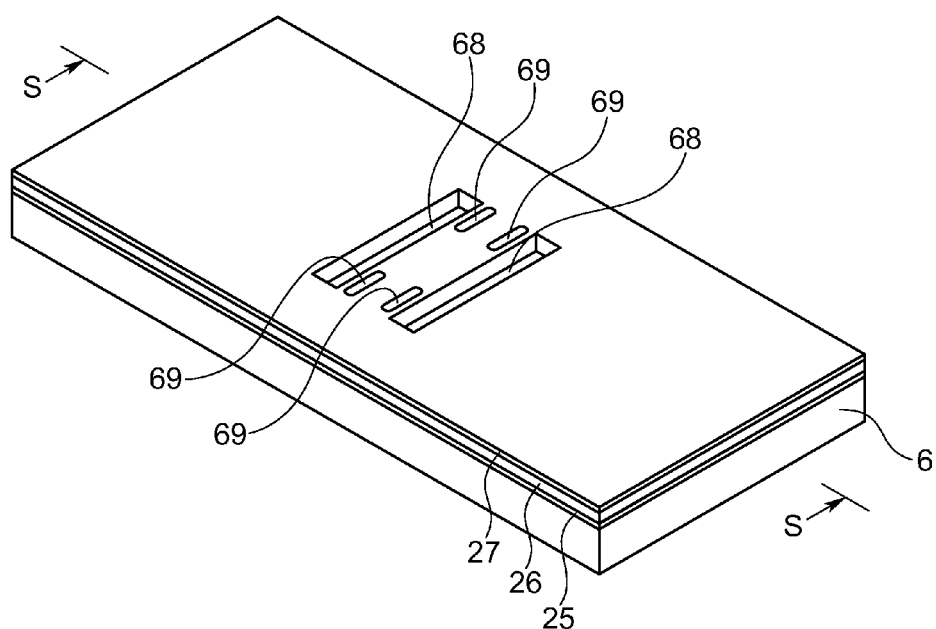
FIG. 5A is a perspective view showing a step of the manufacturing method of the first sensor element according to the first embodiment.
Figure 5B:
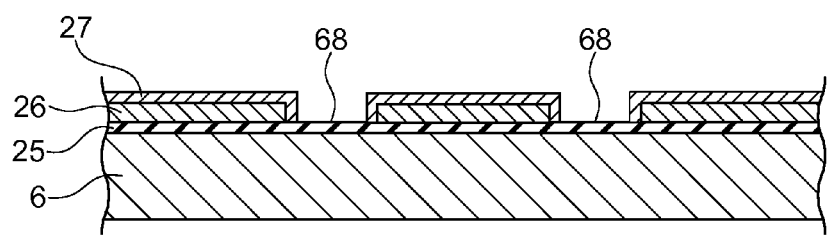
FIG. 5B is a partial end elevational view along the line S-S in FIG. 5A.

Then, as shown in FIG. 5, the resistive layer 27 configured by a piezoresistive layer is formed, the piezoresistive layer being formed in such a manner that a part of the beam forming layer 26 is formed into an N- or P-type semiconductor by liquid-phase doping of impurities into the surface of the silicon layer. Further, the protective film made of $SiO_2$ and the like which is formed on the portions 69 corresponding to the upper surfaces of the first to fourth detecting sections 36 to 39, is removed. At this time, the impurities are doped in the whole surface except the portions 69 corresponding to the upper surfaces of the first to fourth detecting sections 36 to 39, that is, are also doped in the inner surface of the rectangular-shaped holes 68 formed in the beam forming layer 26.

Figure 6A:
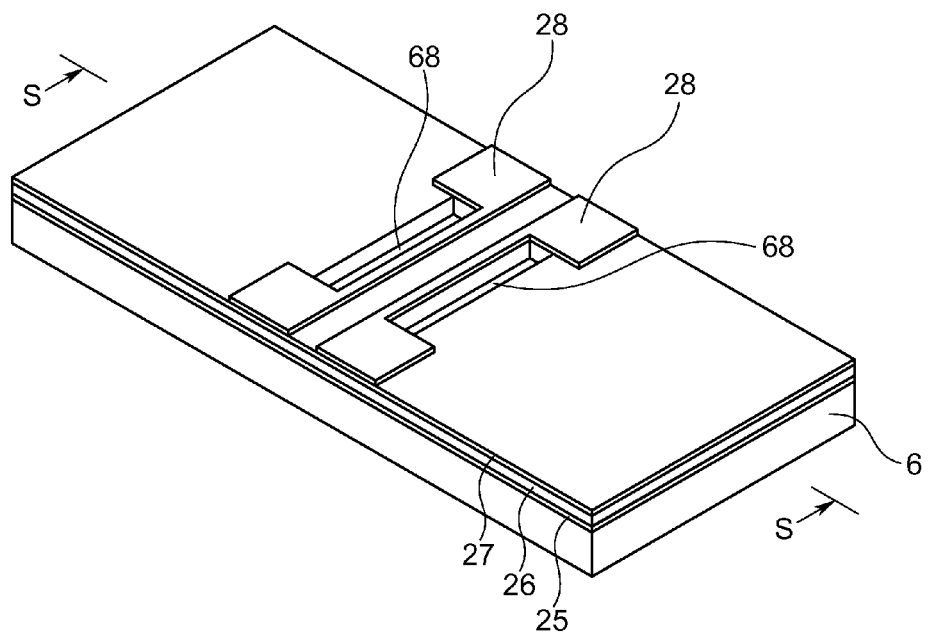
FIG. 6A is a perspective view showing a step of the manufacturing method of the first sensor element according to the first embodiment.
Figure 6B:
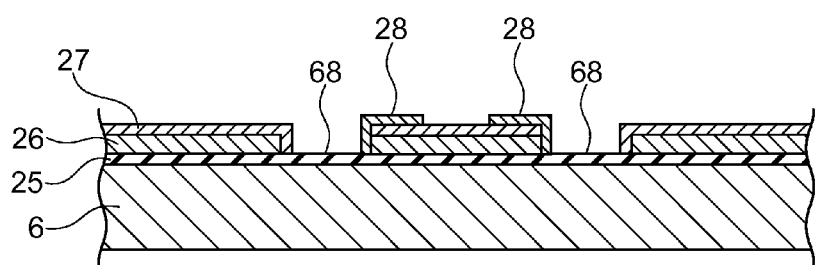
FIG. 6B is an end elevational view along the line S-S in FIG. 6A.
Figure 7A:
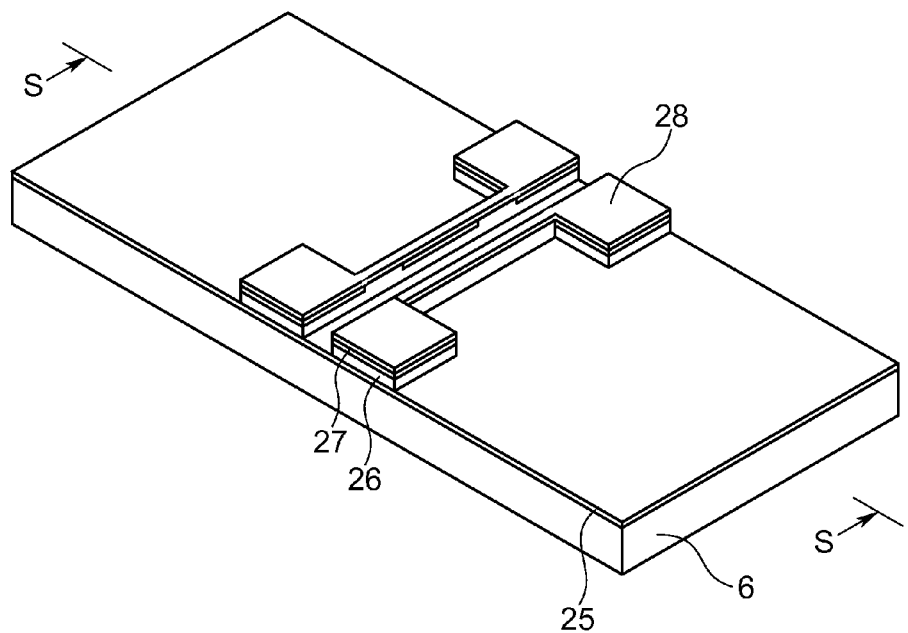
FIG. 7A is a perspective view showing a step of the manufacturing method of the first sensor element according to the first embodiment.
Figure 7B:
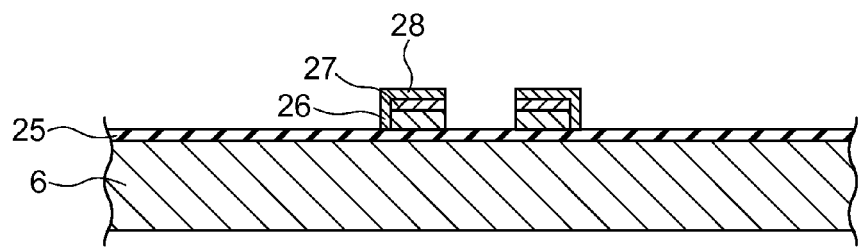
FIG. 7B is a partial end elevational view along the line S-S in FIG. 7A.

Next, as shown in FIG. 6, the conductive layer 28 is formed on the resistive layer 27 on the beam forming layer 26, and is patterned into a beam shape. Thereafter, as shown in FIG. 7, the resistive layer 27 and the beam forming layer 26 are etched with the conductive layer 28 used as a mask. At this time, a resist (not shown) is further partially formed on the upper surface of the conductive layer 28.

Figure 8A:
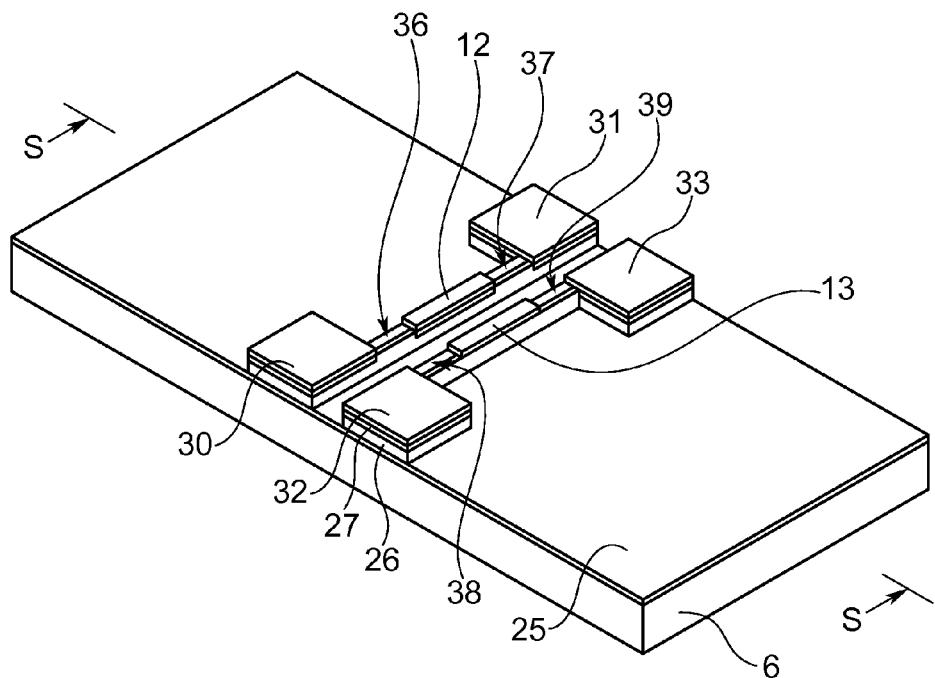
FIG. 8A is a perspective view showing a step of the manufacturing method of the first sensor element according to the first embodiment.
Figure 8B:
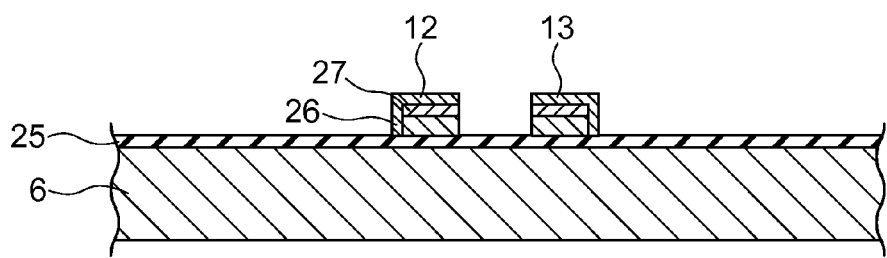
FIG. 8B is a partial end elevational view along the line S-S in FIG. 8A.

Thereafter, as shown in FIG. 8, the portion of the conductive layer 28, on which portion the resist for the conductive layer (not shown) is not formed, is removed, so that the first conductive layer 12 and the second conductive layer 13 are respectively formed at the central portions of the upper surfaces of the first and second beams 7 and 8. As a result, the first to fourth detecting sections 36 to 39 are simultaneously formed on the upper surfaces of the first and second beams 7 and 8.

Figure 9A:
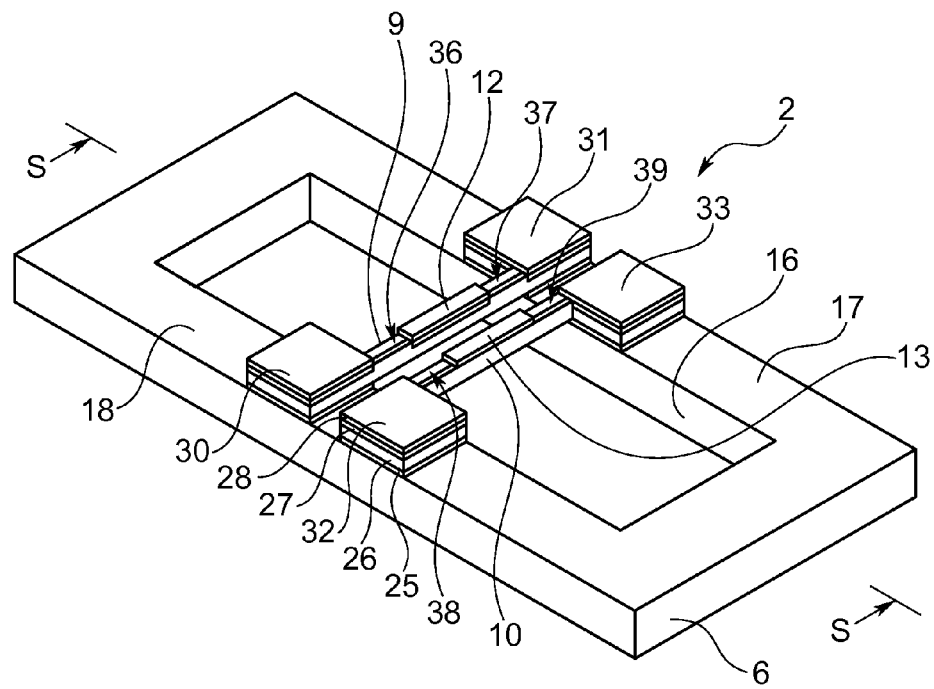
FIG. 9A is a perspective view showing a step of the manufacturing method of the first sensor element according to the first embodiment.
Figure 9B:
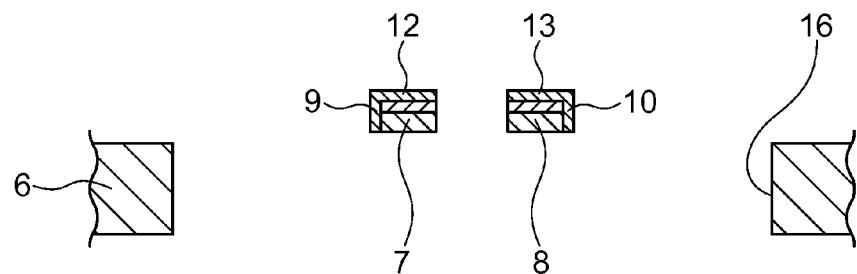
FIG. 9B is a partial end elevational view along the line S-S in FIG. 9A.

Then, the first sensor element 2 is formed in such a manner that a resist (not shown) is formed on the back surface side of the substrate 6, on which side the first and second beams 7 and 8 are not formed, and the substrate 6 and the insulating layer 25 of the portion in which the resist is not formed are removed to form the square hole 16, as shown in FIG. 9.

Figure 10A:
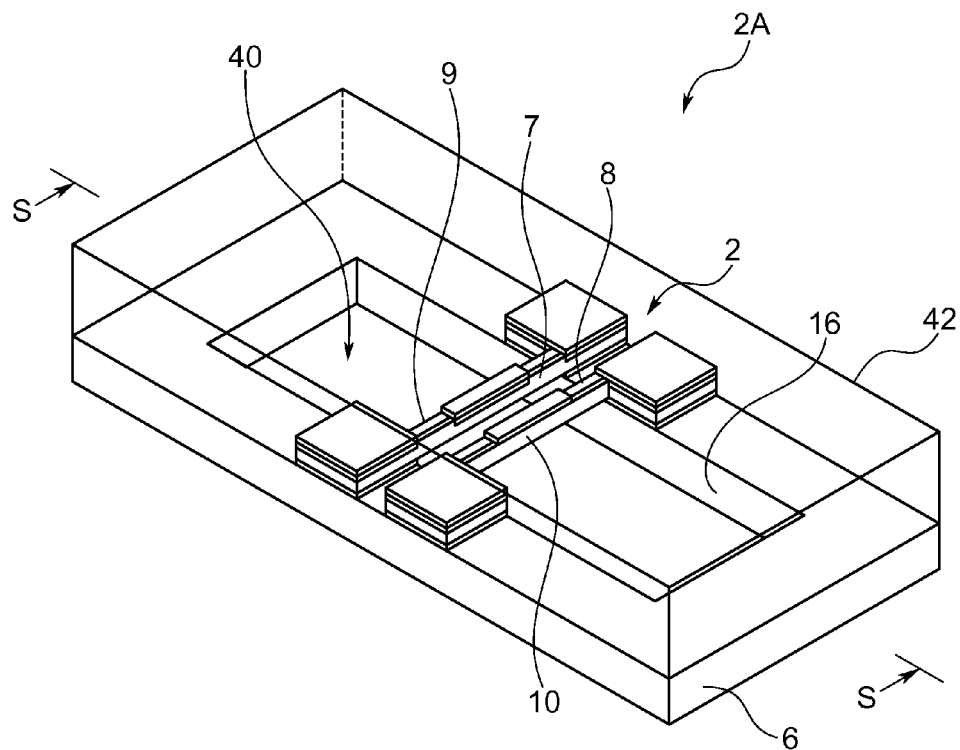
FIG. 10A is a perspective view showing a step of the manufacturing method of the first sensor element according to the first embodiment
Figure 10B:
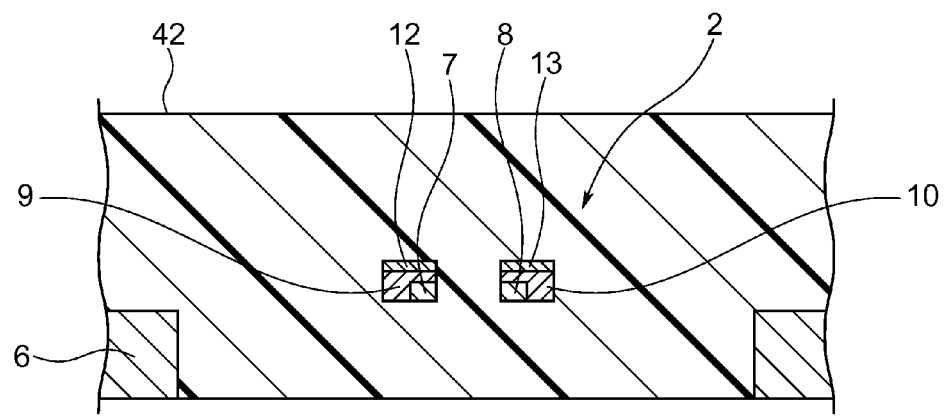
FIG. 10B is a partial end elevational view along the line S-S in FIG. 10A.

Finally, as shown in FIG. 10, a tactile sensor 2A provided with the first sensor element 2 can be obtained by filling, with the outer package member 42, the space 40 which is formed around the first and second beams 7 and 8 and which includes the square hole 16 formed in the substrate 6. By using the semiconductor laminating technique in this way, it is possible to form the first sensor element 2 having a size of about 1.5 mm square, and having the beams each having a width of about 5 µl, a height of about 20 µl, and a length of about 200 µl, for example. In the same manner as the first sensor element 2 described above, the second sensor element 3 can be obtained.

As described above, the resistive layer 27 configured by the piezoresistive layer can be formed on the outer side surfaces 7A and 8A of the first and second beams 7 and 8 by doping impurities into the inner surfaces of the rectangular-shaped holes 68 formed in the substrate 6. The first and second sensor elements 2 and 3 manufactured in this way are formed on the same substrate 6, and then the space 40 formed around the beams is filled with the outer package member 42 to obtain the multi-axial tactile sensor 1.

(Operation and Effects)

Next, the operation and effects of the multi-axial tactile sensor 1 configured in this way will be described. First, a case where shearing force in the x-direction is generated in the outer package member 42 is described.

Figure 11A:
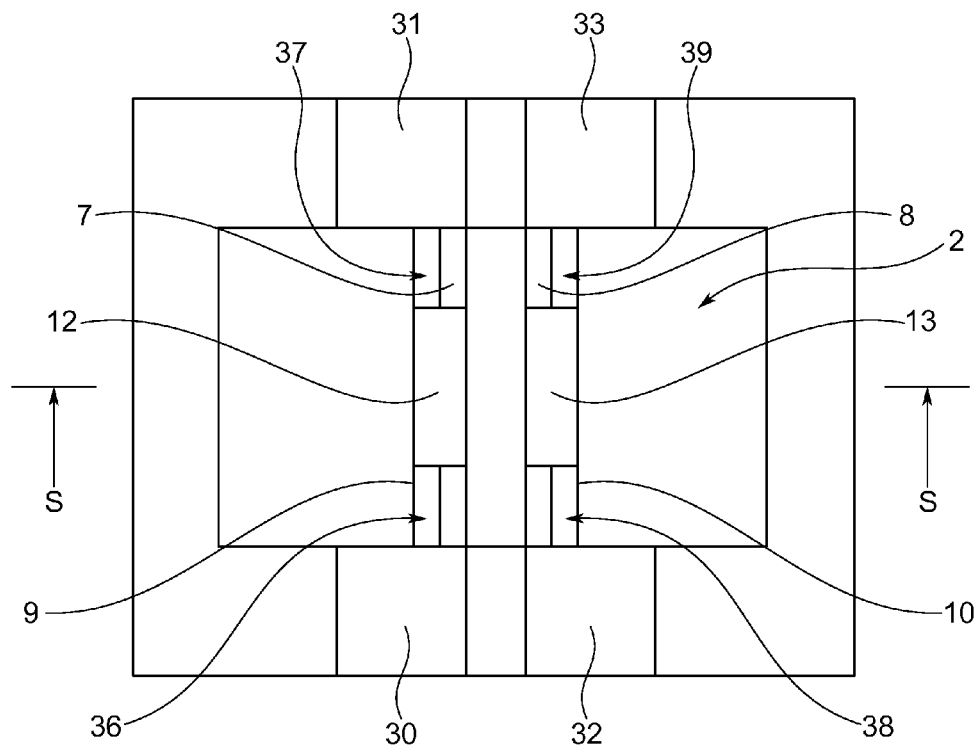
FIG. 11A is a plan view showing an operation of the first sensor element according to the first embodiment.
Figure 11B:
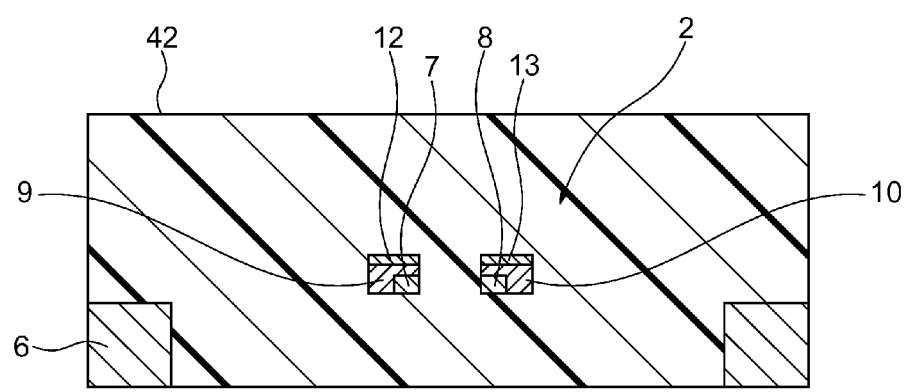
FIG. 11B is an end elevational view along the line S-S in FIG. 11A.

As shown in FIG. 11, when no external force is generated in the outer package member 42, the first and second beams 7 and 8 of the first sensor element 2 maintain a linear shape. When a power supply voltage is applied to the power supply electrode 30, a current flows, in order, through the first resistive layer 9, the first output electrode 31, the second output electrode 33, the second resistive layer 10, and the grounding electrode 32. In this case, when the resistance value of the first and second resistive layers 9 and 10 in the first to fourth detecting sections 36 to 39 is set as R, and when the power supply voltage $V_{in}$ is set as V, the output voltage $V_{out}$ obtained from the first output electrode 31 and the second output electrode 33 becomes V/2. The output voltage $V_{out}$ becomes a voltage corresponding to the ratio of the resistance values of the first and second resistive layers 9 and 10.

Figure 12A:
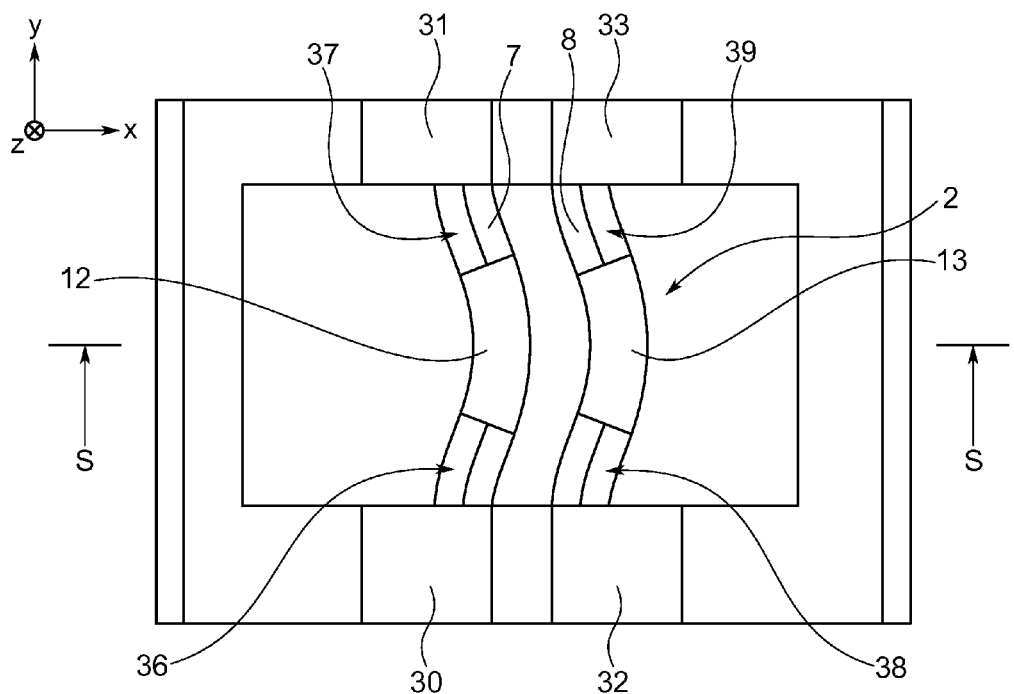
FIG. 12A is a plan view showing an operation of the first sensor element according to the first embodiment.
Figure 12B:
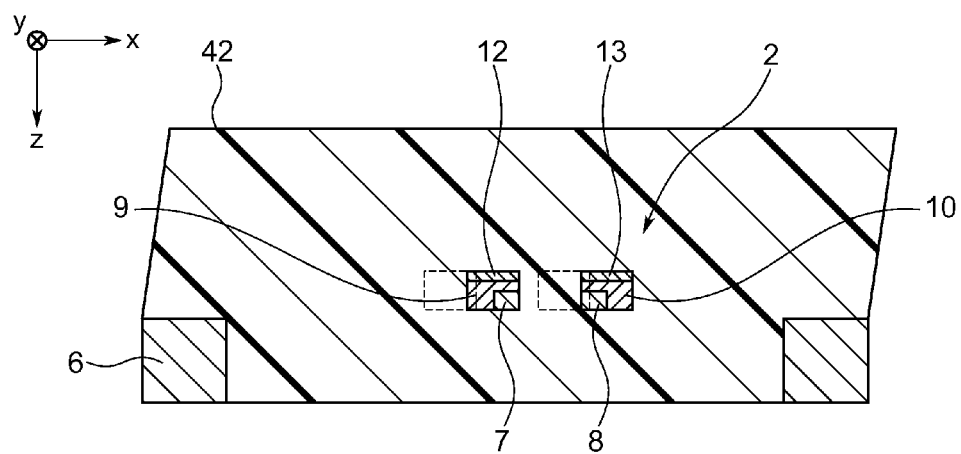
FIG. 12B is an end elevational view along the line S-S in FIG. 12A.

On the other hand, when a shearing force in the x-direction is generated in the outer package member 42, the outer package member 42 is deformed, as shown in FIG. 12, in the same direction as the direction of the shearing force, that is, deformed in the x-direction. Further, the first sensor element 2 is surrounded by the outer package member 42 and hence the first and second beams 7 and 8 are deformed in the x-direction in accordance with the deformation of the outer package member 42. In this case, both ends of the first and second beams 7 and 8 are supported, and hence each of the first and second beams 7 and 8 is bent symmetrically with respect to the central portion thereof. The first detecting section 36 and the second detecting section 37 are then bent in the direction in which the surface with the first resistive layer 9 formed thereon is extended. On the other hand, the third detecting section 38 and the fourth detecting section 39 are bent reversely to the surface with the first resistive layer 9 formed thereon and are bent in the direction in which the surface with the second resistive layer 10 formed thereon is compressed.

Since, when the pair of the first and second detecting sections 36 and 37 are deformed in an extended or compressed manner, the pair of the third and fourth detecting sections 38 and 39 are deformed in a compressed or extended manner, the value of resistance of the pair of the first and second detecting sections 36 and 37, and the value of resistance of the pair of the third and fourth detecting sections 38 and 39 are respectively changed in the opposite positive and negative directions. In this case, it can be said that, since the first and second beams 7 and 8 are configured to have substantially the same mechanical properties, the amount of deformation of the pair of first and second detecting sections 36 and 37 is also substantially the same as the amount of deformation of the pair of third and fourth detecting sections 38 and 39. Accordingly, it can be said that the change amounts of the resistance values respectively become opposite positive and negative values having the same absolute value, that is, the change amount of the resistance value of the first resistive layer 9 in the first and second detecting sections 36 and 37 becomes +dR, and the change amount of the resistance value of the second resistive layer 10 in the third and fourth detecting sections 38 and 39 becomes −dR. As a result, the output voltage $V_{out}$ is changed by dR·V/2R as compared with the output voltage $V_{out}$ before the deformation. Therefore, the first sensor element 2 can measure the shearing force from this voltage change.

In the present embodiment, the first sensor element 2 is configured to have the first and second beams 7 and 8 arranged substantially horizontally with respect to the surface of the substrate 6, and is configured to measure a shearing force generated in the outer package member 42 by detecting deformation of the first and second beams 7 and 8. Therefore, the thickness of the first sensor element 2 can be significantly reduced as compared with the conventional sensor element using the erected cantilever.

In the case of the present embodiment, the first sensor element 2 is configured to measure a voltage corresponding to a ratio of a resistance value of the first resistive layer 9 of the first and second detecting sections 36 and 37 extended or compressed to be deformed by a shearing force, with respect to a resistance value of the second resistive layer 10 of the third and fourth detecting sections 38 and 39 compressed or extended to be deformed, by the shearing force, in the direction opposite to the direction of deformation of the first resistive layer 9. Thus, in the first sensor element 2, even when the temperature (and light intensity) in the environment in which the first sensor element 2 is used is changed, the resistance values of the first and second resistive layers 9 and 10 are changed together, and hence the ratio of resistance values of the first and second resistive layers 9 and 10 becomes substantially the same with respect to the same shearing force. Therefore, the first sensor element 2 can stably measure a shearing force regardless of the temperature (and light intensity) of the environment in which the first sensor element 2 is used.

In the first sensor element 2, the first and second beams 7 and 8 are arranged very close to each other, and a piezoresistive layer constituting the first and second resistive layers 9 and 10 is formed in a single doping procedure. Thus, the first sensor element 2 can suppress the variation in the doping amount as much as possible, and hence the first and second resistive layers 9 and 10 with little variation in the initial resistance value can be easily formed.

It should be noted that the present embodiment describes a case in which the first resistive layer 9 and the second resistive layer 10 in each of the first sensor element 2 and the second sensor element 3 are formed on the outer side surface 7A of the first beam 7 and the outer side surface 8A of the second beam 8, respectively. However, the present invention is not limited to this, and the first resistive layer 9 and the second resistive layer 10 may be respectively formed on the surfaces facing each other. In this case, the first resistive layer 9 and the second resistive layer 10 can be respectively formed on the first beam 7 and the second beam 8 only by forming one rectangular-shaped hole 68 in the beam forming layer 26, and hence the variation in the doping amount can be more surely suppressed.

In the first sensor element 2, each of the first conductive layer 12 and the second conductive layer 13 is formed at the central portion of each of the first and second beams 7 and 8. Thus, the current flowing through the first resistive layer 9 flows from the first detecting section 36 to the second detecting section 37 once through the first conductive layer 12. Consequently, in the first sensor element 2, the resistance value of the first resistive layer 9 is changed only in the first detecting section 36 and the second detecting section 37. Similarly, the current flowing through the second resistive layer 10 flows from the fourth detecting section 39 to the third detecting section 38 once through the second conductive layer 13, and hence the resistance value of the second resistive layer 10 is changed only in the third detecting section 38 and the fourth detecting section 39. In this way, the first sensor element 2 is configured such that the portion, in which the resistance value is changed, is limited to the pair of the first and second detecting sections 36 and 37 and the pair of third and fourth detecting sections 38 and 39, and such that extension or compression of the pair of the first and second detecting sections 36 and 37 is caused in the direction opposite to compression or extension of the pair of third and fourth detecting sections 38 and 39. Thus, the first sensor element 2 can measure a shearing force more accurately.

Figure 13A:
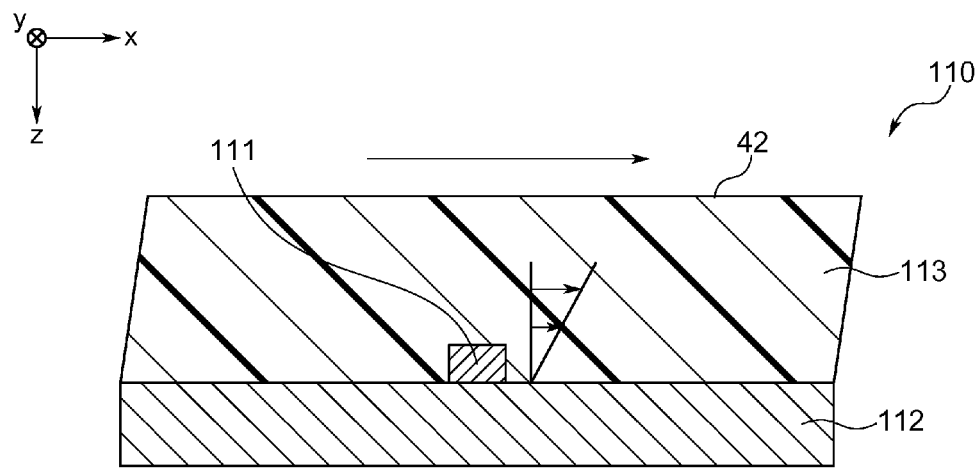
FIG. 13A is a longitudinal sectional view showing a configuration of a state in which a substrate is formed under a beam.

Note that, when a cantilever 111 of a conventional tactile sensor 110 is only held horizontally with respect to the substrate 112 without being erected as shown in FIG. 13A, the outer package member 113 is hardly deformed in the portion of the cantilever 111 because of the substrate 112 under the cantilever 111. For this reason, the tactile sensor 110 shown in FIG. 13A cannot measure a shearing force. The arrows in FIG. 13A show the distribution of power.

Figure 13B:
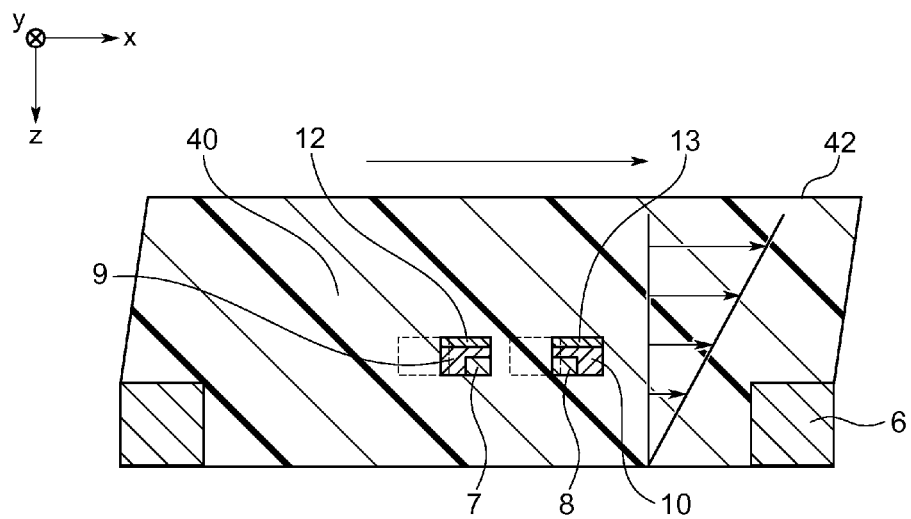
FIG. 13B is a longitudinal sectional view showing an operation of the first sensor element according to the first embodiment.

In contrast, as shown in FIG. 13B, the present embodiment is configured such that the space 40 is formed at portions under the first and second beams 7 and 8 as well as around the first and second beams 7 and 8, and the space 40 is occupied by the outer package member 42. Therefore, the outer package member 42 is easily deformed in the portions of the first and second beams 7 and 8. For this reason, in the present embodiment, the first and second beams 7 and 8 are deformed in accordance with the deformation of the outer package member 42, and thereby a shearing force can be measured.

In the present embodiment, a case is described in which the first resistive layer 9 is continuously formed in the first and second detecting sections 36 and 37, and the second resistive layer 10 is continuously formed in the third and fourth detecting sections 38 and 39. However, the present invention is not limited to this, and a discontinuous section (not shown) having no resistive layer may be formed between the first and second detecting sections 36 and 37 and between the third and fourth detecting sections 38 and 39. When the discontinuous section is provided in this way, the multi-axial tactile sensor 1 can detect, with higher sensitivity, resistance value changes in the first and second detecting sections 36 and 37, and in the third and fourth detecting sections 38 and 39.

In the present embodiment, a case is described in which the first and second conductive layers 12 and 13 are respectively formed on the first and second beams 7 and 8. However, the present invention is not limited to this, and the first and second conductive layers 12 and 13 may not be formed.

Figure 14:
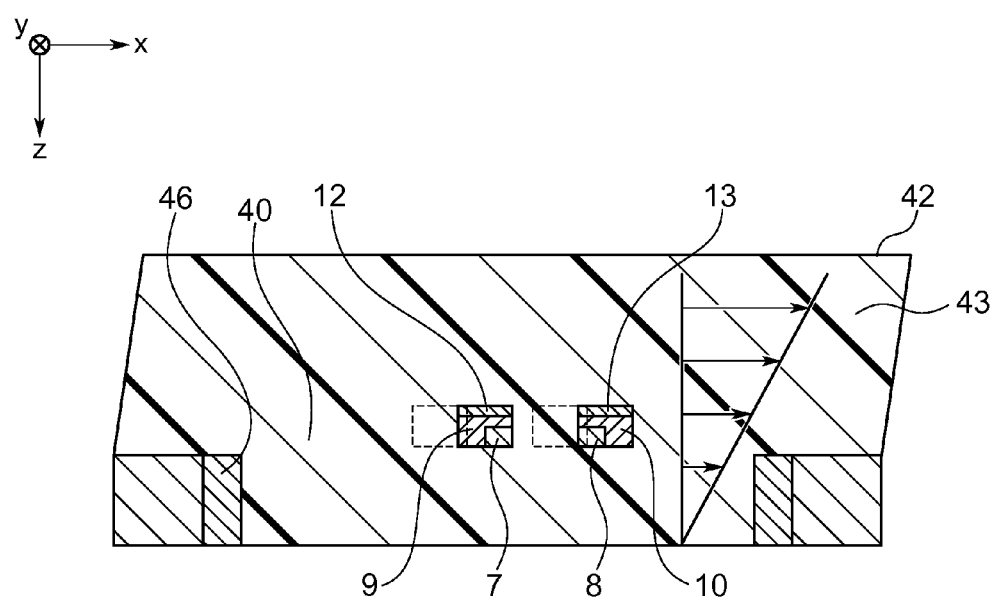
FIG. 14 is a longitudinal sectional view showing a modification of the first sensor element according to the first embodiment.

Further, as shown in FIG. 14, second filling sections 46 may also be formed in the direction in which the first and second beams 7 and 8 are deformed. When the second filling section 46 is configured to have a bulk modulus different from the bulk modulus of the filling section 43, that is, for example, when the second filling section 46 is configured by a member filled with air having a large volumetric shrinkage, the detection sensitivity of shearing force can be improved.

When a shearing force in the y-direction is generated in the outer package member 42, the output voltage $V_{out}$ is not changed in the first sensor element 2. That is, by the y-direction shearing force, the first and second resistive layers 9 and 10 in the first sensor element 2 are extended or contracted in the same direction. As a result, in any pair of positions of the first and second resistive layers 9 and 10, extension or compression of the first resistive layer 9 is not caused in the direction opposite to compression or extension of the second resistive layer 10. Therefore, the resistance value in each of the first and second resistive layers 9 and 10 is also changed in the same manner, so that the output voltage $V_{out}$ is not changed. The y-direction shearing force is measured by the second sensor element 3. The operation and effects of the second sensor element 3 are the same as those of the first sensor element 2 described above, and hence the description thereof is omitted.

When pressure is generated in the outer package member 42, the output voltage $V_{out}$ is not changed in the first and second sensor elements 2 and 3. That is, by the pressure, the first and second resistive layers 9 and 10 in the first and second sensor elements 2 and 3 are extended and contracted in the same direction. As a result, in any pair of positions of the first and second resistive layers 9 and 10, extension or compression of the first resistive layer 9 is not caused in the direction opposite to compression or extension of the second resistive layer 10. Therefore, the resistance value in each of the first and second resistive layers 9 and 10 is also changed in the same manner, so that the output voltage $V_{out}$ is not changed.

The multi-axial tactile sensor 1 according to the present embodiment is provided with the first and second sensor elements 2 and 3 configured as described above, and thereby can measure forces in two orthogonal directions without being affected by the influence of a temperature change. Further, in the multi-axial tactile sensor 1, the periphery of the first and second sensor elements 2 and 3 is covered with the outer package member 42. Thereby, an external force, that is, a shearing force generated in the outer package member 42 can be simultaneously transmitted to the first and second sensor elements 2 and 3, and hence the shearing force can be more surely measured.

In the first and second sensor elements 2 and 3, the first to fourth detecting sections 36 to 39 are provided at the proximal end portions of the beams, at which portions the amount of deformation of each of the beams is large. Therefore, the sensitivity of the first and second sensor elements 2 and 3 can be improved.

(2) Second embodiment (with three cantilevers)
(Entire Configuration)

Next, a second embodiment will be described in which the shape of beams in first and second sensor elements configuring a multi-axial tactile sensor is different from the shape of the beams of the first embodiment described above. The second embodiment will be described with reference to FIG. 15 in which configurations similar to those of FIG. 2 are denoted by the same reference numerals and characters. It should be noted that the configurations of the first and second sensor elements are the same except the difference in the arrangement direction, and hence only the first sensor element is described.

Figure 15A:
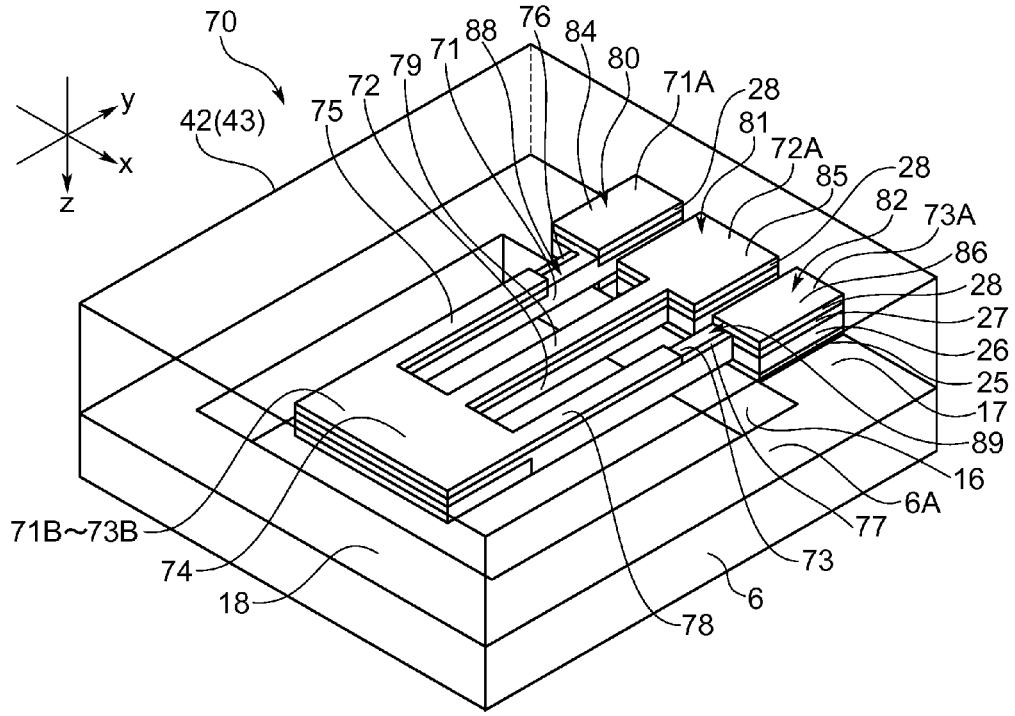
FIG. 15A is a perspective view showing a configuration of a first sensor element according to a second embodiment.
Figure 15B:
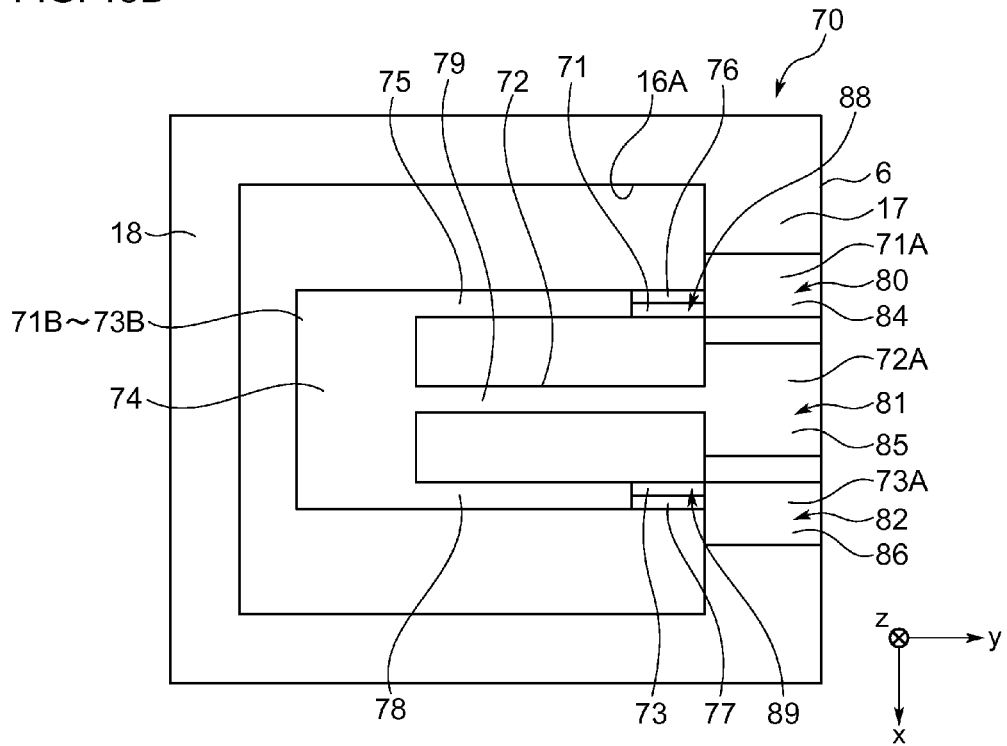
FIG. 15B is a plan view showing a configuration of a first sensor element according to a second embodiment.
Figure 16:
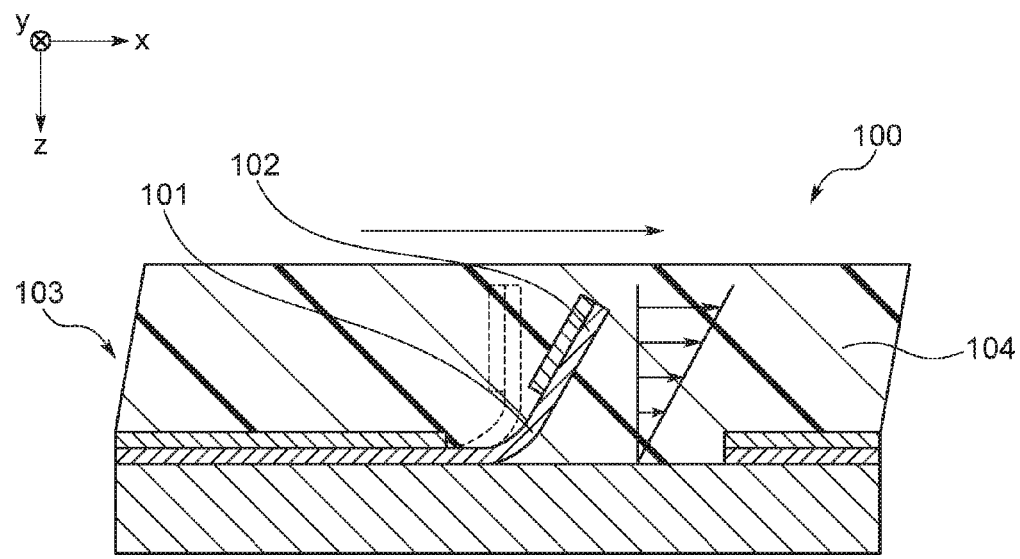
FIG. 16 is a longitudinal sectional view showing an example of the prior art.

A first sensor element 70 shown in FIG. 15 includes three beams each having one end supported on the substrate 6, that is, includes a first beam 71, a second beam 72, and a third beam 73. The first to third beams 71 to 73 have substantially the same length, and the second beam 72 is arranged in the middle, so that the three beams are arranged substantially in parallel with each other and substantially horizontally with respect to the surface of the substrate 6. The first to third beams 71 to 73 are supported by the substrate 6 respectively only at one ends 71A to 73A, and the other ends 71B to 73B of the first to third beams 71 to 73 are, so to speak, free ends. The other ends 71B to 73B of the first to third beams 71 to 73 are integrally connected to each other by a connection section 74. The connection section 74 is formed so that the other ends 71B to 73B of the first to third beams 71 to 73 can be displaced in parallel with a shearing force in the x-direction.

In the first beam 71, a first resistive layer 76 is formed on the outer side surface of the first beam 71 opposite to the one surface facing the second beam 72. Similarly, in the third beam 73, a second resistive layer 77 is formed on the outer side surface of the third beam 73 opposite to the one surface facing the second beam 72. In the second beam 72, the resistive layer is not formed on the surface facing the first and third beams 71 and 73. First and second conductive layers 75 and 78 are respectively formed on the upper surfaces of the first and third beams 71 and 73 except the proximal end portions of the first and third beams 71 and 73. The first and second conductive layers 75 and 78 are respectively conductive to the first and second resistive layers 76 and 77. Further, the first and second conductive layers 75 and 78 are formed to be continuous with a conductive layer 79 formed on the upper surface of the second beam 72.

In the case of the present embodiment, by first to third support sections 80 to 82 which are provided at one side 17 of the square hole 16 of the substrate 6, the first to third beams 71 to 73 are respectively supported on the substrate 6 so as to extend from the one side 17 toward the other side 18 of the square hole 16 opposite to the one side 17. The first beam 71 is supported on the substrate 6 by the first support section 80, the second beam 72 is supported on the substrate 6 by the second support section 81, and the third beam 73 is supported on the substrate 6 by the third support section 82. The conductive layer 28 is formed on each of the uppermost layers of the first to third support sections 80 to 82. The conductive layer 28 formed on the second support section 81 is connected to the conductive layer 28 formed on the upper surfaces of the first to third beams 71 to 73. The conductive layer 28 formed on the first support section 80 constitutes a power supply electrode 84, the conductive layer 28 formed on the second support section 81 constitutes an output electrode 85, and the conductive layer 28 formed on the third support section 82 constitutes a grounding electrode 86. Further, each of the first resistive layer 76 and the second resistive layer 77 is formed integrally with the resistive layer 27 formed in each of the first and third support sections 80 and 82, and is configured by a piezoresistive layer.

A first detecting section 88 as a first deformation section is formed in the first beam 71. That is, the first detecting section 88 having no conductive layer is formed between the power supply electrode 84 and the first conductive layer 75. A second detecting section 89 as a second deformation section is formed in the third beam 73. That is, the second detecting section 89 having no conductive layer is formed between the grounding electrode 86 and the second conductive layer 78. The connection section 74 is formed to have an area larger than the surface area of the first to third beams 71 to 73 and to have a predetermined stiffness.

Similarly to the first embodiment described above, in the first sensor element 70 according to the present embodiment, the first resistive layer 76 and the second resistive layer 77 are connected to each other in series, to configure a resistance ratio output circuit as a whole. That is, the resistance ratio output circuit is configured by connecting, in series in order, the power supply electrode 84, the first resistive layer 76, the output electrode 85 (connection section 74), the second resistive layer 77, and the grounding electrode 86.

(Operation and Effects)

Since, in the first sensor element 70, a resistance ratio output circuit is configured similarly to the first embodiment described above, the output voltage $V_{out}$ obtained from the output electrode becomes V/2 at the time when no external force is applied to the outer package member 42.

On the other hand, when a shearing force in the x-direction is generated in the outer package member 42, the first to third beams 71 to 73 of the first sensor element 70 are integrally deformed in the x-direction in accordance with the deformation of the outer package member 42. In this case, each of the first to third beams 71 to 73 are supported only by each of the one ends 71A to 73A, and the other ends 71B to 73B of the first to third beams 71 to 73 are configured as free ends. Therefore, the proximal end portions of the first to third beams 71 to 73 are bent most. Therefore, in the first detecting section 88, the surface with the first resistive layer 76 formed thereon is bent in the extending direction. On the other hand, in the second detecting section 89, the surface with the second resistive layer 77 formed thereon is bent in the compressing direction.

In this way, the pair of the first resistive layer 76 formed in the first detecting section 88, and the second resistive layer 77 formed in the second detecting section 89 are respectively deformed in an extended and compressed manner or in a compressed and extended manner in directions opposite to each other. In this case, it can be said that, since the other ends 71B to 73B of the first to third beams 71 to 73 are integrated together by the connection section 74 and are formed to be displaced in parallel with each other, the amount of deformation of the first detecting section 88, and the amount of deformation of the second detecting section 89 are substantially equal to each other. In this configuration, when the amount of change (absolute value) of the resistance value is set as dR similarly to the first embodiment described above, the output voltage $V_{out}$ after the deformation is changed by $dR \cdot V/2R$ as compared with the output voltage $V_{out}$ before the deformation. Therefore, a shearing force can be measured from this voltage change.

In the present embodiment, the first sensor element 70 includes the first to third beams 71 to 73 arranged substantially horizontally to the surface of the substrate 6, and is configured to measure a shearing force generated in the outer package member 42 by detecting deformation of the first to third beams 71 to 73. Thus, the same effects as those of the first embodiment described above can be obtained.

Further, the first sensor element 70 according to the present embodiment is configured to measure a voltage corresponding to the ratio of a resistance value of the first resistive layer 76 of the first detecting section 88 extended or compressed to be deformed by a shearing force, with respect to a resistance value of the second resistive layer 77 of the second detecting section 89 compressed or extended to be deformed by the shearing force in the direction opposite to the direction of the deformation of the first resistive layer 76. Thus, the same effects as those of the first embodiment described above can be obtained.

(5) Modification

The present invention is not limited to the above described embodiments, and may be suitably changed within the scope and spirit of the present invention.

In the case of the above-described embodiments, a case is described in which a resistance ratio output circuit is configured by the first resistive layer and the second resistive layer to measure a voltage corresponding to a ratio of resistance values. However, the present invention is not limited to this, and the resistance of each of the first resistive layer and the second resistive layer may be measured individually, so as to set the change amount in each of the measured values as a measurement value of external force.

In the case of the above-described embodiment, a case is described in which two resistive layers of the first resistive layer and the second resistive layer are provided, but a single resistive layer may be possible.

In the case of the above-described embodiment, a case is described in which each of the first resistive layer and the second resistive layer is a piezoresistive layer. However, the present invention is not limited to this, and either one of the first resistive layer and the second resistive layer may be configured by a layer having a fixed resistance value.

In the case of the above-described embodiment, a case is described in which the multi-axial tactile sensor is configured by two sensor elements. However, the present invention is not limited to this, and the multi-axial tactile sensor may include three or more sensor elements.

In the case of the above-described embodiment, the two sensor elements are arranged in directions in which the beam of one of the two sensor elements is perpendicular to the beam of the other of the two sensor elements. However, the present invention is not limited to this, and the multi-axial tactile sensor may be provided with three or more sensor elements and configured to further measure a moment by radially arranging the beams of the sensor elements.

In addition, the embodiment of the present invention is not limited to the multi-axial tactile sensor, and may be applied to a tactile sensor configured by one sensor element and an outer package member covering the sensor element.

In the case of the above-described embodiment, a case is described in which the longitudinal thickness of the beam is fixed. However, the present invention is not limited to this, and the deformation section may be formed to be thinner than the other portions, so as to be deformed more easily at the deformation section.

In the case of the above-described embodiment, a case is described in which the resistive layer is provided at the deformation section, and in which a shearing force is measured in such a manner that deformation of the beam is detected from a resistance value change generated by deformation of the resistive layer. However, the present invention is not limited to this, and deformation of the beam may be detected by a method using a change of electrostatic capacitance, a change of inductance, interference of light, and the like.

The invention claimed is:

1. A tactile sensor comprising:
   a sensor element provided in a plane substantially at the same level as a surface of a substrate, and
   an outer package member covering around the sensor element and transmitting external force to the sensor element, wherein
   the substrate has a hole in a rectangular shape,
   the sensor element includes: a flexible doubly-supported beam stretched between one side and the other side of the hole facing each other and having both ends supported by the substrate; or a flexible cantilever having one end supported by the substrate so as to extend from the one side toward the other side of the hole opposite to the one side,
   the outer package member covers a top surface, a surface opposite to the top surface and side surfaces opposite to each other of the doubly-supported beam or the cantilever, and
   the sensor element detects deformation of the doubly-supported beam or the cantilever, the deformation being caused in a direction in parallel with the surface of the substrate.

2. The tactile sensor according to claim 1, wherein the doubly-supported beam or the cantilever includes a deformation section with a resistive layer formed on the surface of the beam, the surface being extended or compressed to be deformed by the external force.

3. The tactile sensor according to claim 2, wherein
   the deformation section includes:
   a first deformation section having a first resistive layer formed on a surface of the first deformation section, the surface being extended or compressed to be deformed by the external force; and
   a second deformation section having a second resistive layer formed on a surface of the second deformation section, the surface being compressed or extended to be deformed by the external force in the direction opposite to the deformation of the first deformation section, and a voltage corresponding to a ratio between a resistance value of the first resistive layer and a resistance value of the second resistive layer is measured.

4. The tactile sensor according to claim 3, wherein the doubly-supported beam or the cantilever includes a conductive layer formed at a central portion on the top surface of the doubly-supported beam or the cantilever so as to be conductive to the first and second resistive layers.

5. The tactile sensor according to claim 3, wherein the first and second deformation sections of the doubly-supported beam or the cantilever are formed to be thinner than the other portions of the doubly-supported beam or the cantilever.

6. The tactile sensor according to claim 3, wherein one of the first and second resistive layers is configured by a layer having a fixed resistance value.

7. The tactile sensor according to claim 1, wherein a surface of the outer package member facing the surface of the substrate is formed substantially in parallel with the surface of the substrate.

8. The tactile sensor according to claim 1, wherein
the outer package member includes
a filling section covering around the sensor element, and
a surface section covering the surface of the filling section and made of a material having an elastic modulus different from the elastic modulus of the filling section.

9. The tactile sensor according to claim 1, wherein
the outer package member includes
a first filling section covering around the sensor element, and
a second filling section made of a material having a bulk modulus different from the bulk modulus of the first filling section.

10. The tactile sensor according to claim 7, wherein
the doubly-supported beam or the cantilever of the sensor element is deformed by shearing force applied to the surface of the outer package member.

11. The tactile sensor according to claim 3, wherein
the sensor element includes two doubly-supported beams arranged in parallel with each other and horizontally with respect to the substrate,
one of the doubly-supported beams is provided with the first deformation section, and the other of the doubly-supported beams is provided with the second deformation section, and
the first and second deformation sections are extended or compressed to be deformed by shearing force applied to the surface of the outer package member.

12. The tactile sensor according to claim 3, wherein
the sensor element includes three cantilevers arranged in parallel with each other and horizontally with respect to the substrate, and the sensor element includes a connection section connecting ends of the cantilevers to each other,
one of two cantilevers of the three cantilevers arranged on outer sides is provided with the first deformation section, and the other of the two cantilevers of the three cantilevers arranged on the outer sides is provided with the second deformation section, and
the first and second deformation sections are extended or compressed to be deformed by shearing force applied to the surface of the outer package member.

13. A multi-axial tactile sensor comprising
a plurality of sensor elements provided in a plane substantially at the same level as the surface of a substrate, and
an outer package member covering around the sensor elements and transmitting external force to the sensor elements, wherein
the substrate has a hole in a rectangular shape,
the sensor elements each include: a flexible doubly-supported beam stretched between one side and the other side of the hole facing each other and having both ends supported by the substrate; or a flexible cantilever having one end supported by the substrate so as to extend from the one side toward the other side of the hole opposite to the one side,
the outer package member covers a top surface, a surface opposite to the top surface and side surfaces opposite to each other of the doubly-supported beam or the cantilever, and
the sensor elements detect deformation of the doubly-supported beam or the cantilever, the deformation being caused in the direction in parallel with the surface of the substrate.

* * * * *